(12) United States Patent
Gnutek et al.

(10) Patent No.: US 11,700,833 B2
(45) Date of Patent: Jul. 18, 2023

(54) ANIMAL REAR LEG POSITION CONTROL DEVICE, A MILKING STABLE PROVIDED THEREWITH, AND A ROTARY PARLOUR

(71) Applicant: DELAVAL HOLDING AB, Tumba (SE)

(72) Inventors: Michal Gnutek, Tumba (SE); Tomasz Zawislanski, Tumba (SE)

(73) Assignee: DeLaval Holding AB, Tumba (SE)

( * ) Notice: Subject to any disclaimer, the term of this patent is extended or adjusted under 35 U.S.C. 154(b) by 481 days.

(21) Appl. No.: 16/618,472

(22) PCT Filed: Jun. 7, 2018

(86) PCT No.: PCT/SE2018/050589
§ 371 (c)(1),
(2) Date: Dec. 2, 2019

(87) PCT Pub. No.: WO2018/226151
PCT Pub. Date: Dec. 13, 2018

(65) Prior Publication Data
US 2021/0144958 A1 May 20, 2021

(30) Foreign Application Priority Data
Jun. 9, 2017 (SE) .................................. 1750735-1

(51) Int. Cl.
*A01K 1/12* (2006.01)
*A01K 1/06* (2006.01)

(52) U.S. Cl.
CPC ............ *A01K 1/126* (2013.01); *A01K 1/0613* (2013.01)

(58) Field of Classification Search
CPC . A01K 1/0613; A01K 15/00; A61D 2003/006
See application file for complete search history.

(56) References Cited

U.S. PATENT DOCUMENTS

| 2,110,909 A | 3/1938 | Henderson |
| 4,685,422 A | 8/1987 | Middel et al. |

(Continued)

FOREIGN PATENT DOCUMENTS

| GB | 2546469 A | * 7/2017 | ............ A45D 29/18 |
| WO | 85/02973 A1 | 7/1985 | |

(Continued)

OTHER PUBLICATIONS

International Search Report and Written Opinion, dated Oct. 9, 2018, from corresponding PCT application No. PCT/SE2018/050589.

(Continued)

*Primary Examiner* — Peter M Poon
*Assistant Examiner* — Shada Mohamed Alghailani
(74) *Attorney, Agent, or Firm* — Nixon & Vanderhye

(57) ABSTRACT

An animal rear leg position control device includes a body having a lower side; a first lateral side; a second lateral side; a front end; a rear side, where a longitudinal direction is defined by a line extending from the front end to the rear side; a first transition area defines a first rear corner of said body; and a second transition area defines a second rear corner of said body, where the front end is configured to be turned towards a front part of a milking stable when the body is in an operative position, and the rear side is configured to be turned towards a rear part of a milking stable when said body is in the operative position in the milking stable. The first rear corner and the second rear corner are positioned at different longitudinal positions in the longitudinal direction of the body.

20 Claims, 3 Drawing Sheets

(56) References Cited

U.S. PATENT DOCUMENTS

| | | |
|---|---|---|
| 8,899,185 B2 | 12/2014 | Hiley |
| 9,277,728 B2 | 3/2016 | McDougal et al. |
| 9,549,530 B2 | 1/2017 | Harty, Sr. et al. |
| 9,675,041 B2 | 6/2017 | Eriksson et al. |
| 2010/0242845 A1 | 9/2010 | Pharaoh |
| 2013/0000562 A1* | 1/2013 | Hiley ................. A01K 1/12 |
| | | 119/651 |
| 2016/0235032 A1 | 8/2016 | McDougal et al. |
| 2017/0086420 A1 | 3/2017 | Harty, Sr. et al. |

FOREIGN PATENT DOCUMENTS

| | | |
|---|---|---|
| WO | 2011/098994 A2 | 8/2011 |
| WO | 2011/114138 A1 | 9/2011 |
| WO | 2012/005602 A2 | 1/2012 |
| WO | 2014/081379 A1 | 5/2014 |

OTHER PUBLICATIONS

SE Search Report, dated Jan. 25, 2018, from corresponding SE application No. 1750735-1.

\* cited by examiner

ANIMAL REAR LEG POSITION CONTROL DEVICE, A MILKING STABLE PROVIDED THEREWITH, AND A ROTARY PARLOUR

TECHNICAL FIELD

The present invention relates to an animal rear leg position control device, comprising a body having a lower side that is configured to rest in an operative position on a floor of a milking stable, a first lateral side and a second lateral side that is opposite to the first lateral side, and a front end and a rear side that is opposite to the front end, wherein a longitudinal direction of the body is defined by a line extending from the front end to the rear side, wherein a first transition area where the first lateral side turns into the rear side defines a first rear corner of said body, and a second transition area where the second lateral side turns into the rear side defines a second rear corner of said body, wherein the front end is configured to be turned towards a front part of a milking stable when said body is in an operative position in the milking stable, and the rear side is configured to be turned towards a rear part of a milking stable when said body is in an operative position in the milking stable.

The invention also relates to a milking stable, comprising a front part, a rear part, a milking apparatus arranged in the region of the rear part, a floor that, in the rear part of the milking stable, has a rear edge, wherein the rear edge extends along a line that in relation to a line that is perpendicular in relation to a longitudinal direction of the milking stable has angle in the range of 5°-45°, and wherein the milking stable is configured to house an animal standing with its head turned towards the front part of the milking stable during milking of the animal by means of said milking apparatus and with its rear legs in the rear part of the milking stable.

The invention also relates to a rotary parlour comprising a rotary platform on which there is arranged a plurality of milking stables, each stable having a longitudinal direction which has an angle of 5°-45° in relation to a radius extending from the rotational axis of the rotating platform

BACKGROUND ART

Milking stables for the milking of cows may be provided with a device that causes the cow to stand with a predetermined minimum distance between its rear legs, thereby enabling a facilitated attachment of a milking apparatus to the udder of the cow. The attachment may be performed either manually or automatically by means of a robot. In the absence of such a rear leg position control device, the cow might stand with its rear legs to close to each other, thereby obstructing the attachment of the milking apparatus. The rear leg position control device may comprise a body that has a height of at least 5 cm, a width of at least 20 cm, and a length of at least 25 cm. It may have an uneven upper surface in order to make it uncomfortable for the cow to stand on. The rear leg position control device may be made by metal or by a polymer. Normally it has a symmetric shape and has a symmetry line that is in alignment with a longitudinal centre line of the milking stable. In other words, the longitudinal centre line of the body of the leg position control device may coincide with the longitudinal centre line of the milking stable.

On so called rotary parlours, a plurality of milking stables is arranged on a circular and rotating platform. Each stable has a longitudinal direction which has an angle in relation to a radius extending from the axis of rotation of the platform to the stable in question. The rear edge of a floor of each stable will thus have a corresponding angle in relation to a line that is perpendicular to the longitudinal direction of that milking stable. When rear leg position control devices of prior art are arranged in rear part of such an oblique milking stable (the stable has the shape of parallelogram) with its longitudinal centre line coinciding with the longitudinal centre line of the milking stable, the distance between a rear side of the rear leg position control device and the rear edge of the milking stable floor will be different in one end of said rear side than in the other end thereof. As a result thereof, the cow may stand with one of its hoofs behind the body of the rear leg position control device instead of standing with that hoof beside the body of the rear leg position control device. Thereby, the distance between the rear legs of the cow may be too short for expedient and precise attachment of a milking apparatus to the udder of the cow.

It is an object of the invention to present an alternative animal rear leg position control device that remedies the above-mentioned draw-back of animal rear leg position control devices of prior art.

SUMMARY OF THE INVENTION

The object of the invention is achieved by means of the initially defined animal rear leg position control device, characterised in that the first rear corner and the second rear corner are positioned at different longitudinal positions in the longitudinal direction of the body. Thereby, the animal rear leg position control device may be positioned in an oblique stable as described hereinabove with its longitudinal centre line in parallel with longitudinal centre line of the milking stable, and the distance between the first and second rear corners of the body of the animal rear leg position control device and the rear edge of the floor of the milking stable can be equal, something that would be impossible if the first and second rear corners would have had the same longitudinal position in the longitudinal direction of body of the animal rear leg position control device and the latter has its longitudinal direction parallel with the longitudinal direction of the stable. Thereby, unwanted positioning of one of the cows hoofs behind the animal rear leg position control device can be prevented. According to one embodiment, the difference in position between the first rear corner and second rear corner in the longitudinal direction of the body is at least 1 cm. According to another embodiment the difference is at least 5 cm.

It should be understood that the first lateral side and second lateral side are external surfaces of the body of said device, and that the total width of said body in a direction transverse to the longitudinal direction of the body is defined by the distance between the first lateral side and the second lateral side.

According to one embodiment, a rectilinear line that extends from the first rear corner to the second rear corner has an angle α in the range of 5°-45° relative a line which is perpendicular to the longitudinal direction of said body. The angle is chosen with due regard to the angle between the rear edge of a floor of a milking stable and a line perpendicular to the longitudinal centre line of the milking stable. The rear side of said body may be rectilinear or may present a curvature. According to one embodiment, the rear side is concave.

According to one embodiment, a rectilinear line that extends from the first rear corner to the second rear corner has an angle α in the range of 20°-45° relative a line which is perpendicular to the longitudinal direction of said body.

According to one embodiment, the first lateral side is parallel to the second lateral side. Thereby, the width of said body is the same along the whole length of the body.

According to one embodiment, the overall shape of said body, as seen from above, is the shape of a parallelogram. The term "overall" is used in order to emphasize that there can be slight deviations from absolute parallelism between opposing sides. For example, the front end and the rear side may deviate somewhat from absolute parallelism, while the overall shape of said body is still that of a parallelogram. According to one embodiment said body has the overall shape of a parallelogram wherein the front end and the rear side are both concave.

According to one embodiment, the first and second lateral sides have different lengths and the overall shape of said body, as seen from above, is an isosceles trapezoidal shape. Likewise to the previously described parallelogram shape also this shape may deviate somewhat from absolute parallelism between opposite sides while still being defined as isosceles trapezoidal. According to one embodiment said body has the overall shape of an isosceles trapezoid wherein the front end and the rear side are both concave.

According to one embodiment, the line that defines the longitudinal direction of the body is a centre line extending between the first and second lateral sides from a mid-point of the front end to a mid-point of the rear side. Mid-point is referred to as in the middle between the first lateral side and the second lateral side at any given longitudinal level in the longitudinal direction of the body.

According to one embodiment, the animal rear leg position control device comprises two or more separate sub-bodies that together form said body. For example the body may comprise two rectangular sub-bodies arranged sided by side. These sub-bodies may be of equal length and be displaced in the longitudinal direction in relation to each other, such that a body according to the principles of the invention as described hereinabove is obtained. As an alternative these sub-bodies may be of different length, such that a body according to the principles of the invention as described hereinabove is obtained. Bodies of different length may of course also be configured to be displaced in the longitudinal direction in relation to each other. Thereby, the angle between a rectilinear line that extends from the first rear corner to the second rear corner has an angle α relative a line which is perpendicular to the longitudinal direction of said body which can be altered depending on the obliqueness of the milking stable. Numerous other sub-body combinations are comprised by the scope of protection of the present invention.

According to one embodiment, the body comprises two sub-bodies, wherein a first sub-body has first and second rear corners that are positioned at the same longitudinal positions in the longitudinal direction of the body, and a second sub-body that has a wedge shape as seen from above and that is configured to be arranged along a rear side of the first sub-body.

According to one embodiment, the body has a maximum height of at least 5 cm. It should be understood that said body has a design that makes it uncomfortable for an animal, preferably a cow, to stand with its hoofs on said body. The upper surface of the body may be flat. However, according to one embodiment, the upper surface has a curvature. According to one embodiment said body has an apex point in a centre zone of the body, wherein, from that apex point, the upper surface slopes towards the front end, the rear side and the first and second lateral sides. The inclination of the sloping surface is preventive against hoof-positioning on said body, since animals will feel uncomfortable standing on such sloping surface. As an alternative an upper surface comprising irregularities caused by pits therein and/or projections thereon will also be effective in order to achieve the effect of being uncomfortable to stand on.

According to one embodiment, the distance between the first lateral side and the second lateral side at the first and second transition areas is at least 20 cm.

According to one embodiment, the length of the body, as seen along the longitudinal direction from a mid-point of the rear side to a mid-point of the front end, is at least 25 cm. According to a further embodiment, said length of the body is at least 40 cm, or at least 50 cm.

The object of the invention is also achieved by a milking stable, comprising a front part, a rear part, a milking apparatus arranged in the region of the rear part, a floor that, in the rear part of the milking stable, has a rear edge, wherein the rear edge extends along a line that in relation to a line that is perpendicular in relation to a longitudinal direction of the milking stable has angle in the range of 5°-45°, and wherein the milking stable is configured to house an animal standing with its head turned towards the front part of the milking stable during milking of the animal by means of said milking apparatus and with its rear legs in the rear part of the milking stable, said milking stable being characterised in that it comprises an animal rear leg position control device as defined hereinabove or hereinafter positioned in the rear part of the milking stable with its rear side turned towards the rear edge of the floor of the milking stable. According to one embodiment, a longitudinal centre line of the animal rear leg position control device is parallel with a longitudinal centre line of the milking stable, and according to one embodiment, a longitudinal centre line of the animal rear leg position control device is coinciding with a longitudinal centre line of the milking stable. The rear edge may be formed by an edge of the floor, wherein there is a step between the floor and surrounding ground where the floor is ended by said edge. Alternatively, the edge of the floor is formed by an element such as a bar or the like that extends on or slightly above the floor and forms a imitating edge that defines a rear limit or border of the stable.

According to one embodiment, a rectilinear line extending from the first rear corner to the second rear corner of the animal rear leg position control device has an angle of not more than 10° to the rear edge of the floor of the milking stable. If the rear edge of the floor has a curvature, the angle α is measured between said rectilinear line and a line having the direction of the edge of the floor where the latter is intersected by the longitudinal centre line of the milking stable.

According to one embodiment, a rectilinear line extending from the first rear corner to the second rear corner of the animal rear leg position control device is generally parallel with the rear edge of the floor of the milking stable. If the rear edge of the floor has a curvature, said rectilinear line is parallel with a tangent of the edge of the floor where the latter is intersected by the longitudinal centre line of the milking stable.

According to one embodiment, the distance between the rear side of the animal rear leg position control device and the rear edge of the floor of the milking stable is in the range of 5-15 cm. Preferably the maximum distance between any of the first and second rear corners of said body and the rear edge of the floor is less than 10 cm. Preferably the distance between the first rear corner of said body and the rear edge of said floor and the distance between the second rear corner of said body and the rear edge of the floor does not differ more than 5 cm, preferably not more than 1 cm. The distance may differ along the length of the rear side of said body due to the fact that the rectilinear line from the first rear corner to the second rear corner has a different direction than the rear edge, or that the rear edge has a curvature or irregularity, or that the rear side has a curvature or irregularity, or a combination of these.

According to one embodiment, the longitudinal direction of the animal rear leg position control device is parallel to the longitudinal direction of the milking stable.

According to one embodiment, the longitudinal direction of the animal rear leg position control device is parallel to the longitudinal direction of the milking stable.

According to one embodiment, the milking stable is milking stable arranged on a rotary parlour.

The object of the invention is also achieved by means of a rotary parlour comprising a rotary platform on which there is arranged a plurality of milking stables, each stable having a longitudinal direction which has an angle of 5°-45° in relation to a radius extending from the rotational axis of the rotating platform, said rotary parlour being characterised in that the milking stables arranged on the rotating platform are milking stables according to the present invention as defined hereinabove or hereinafter in this disclosure. The radius is a radius that intersects the centre line of the milking stable at the front end of the milking stable.

Further features and advantages of the present invention will be presented the following detailed description of embodiments.

BRIEF DESCRIPTION OF THE DRAWINGS

The invention will now be described more in detail with reference to the annexed drawing, on which.

DETAILED DESCRIPTION

Figure 1:
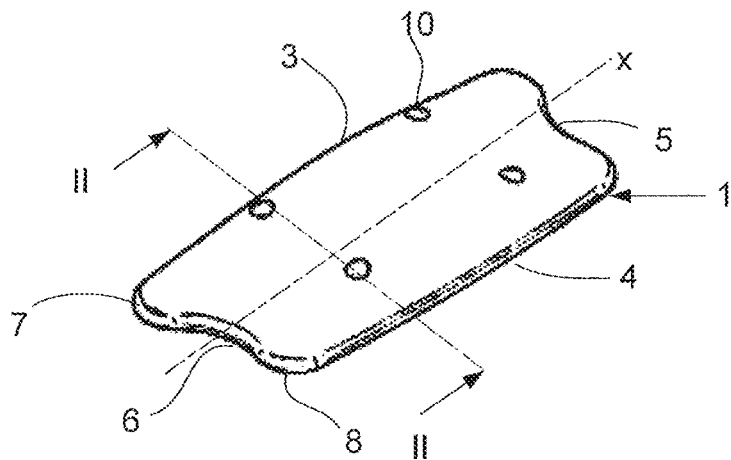
FIG. 1 is a perspective view of a first embodiment of an animal rear leg position control device according to the present invention.
Figure 2:
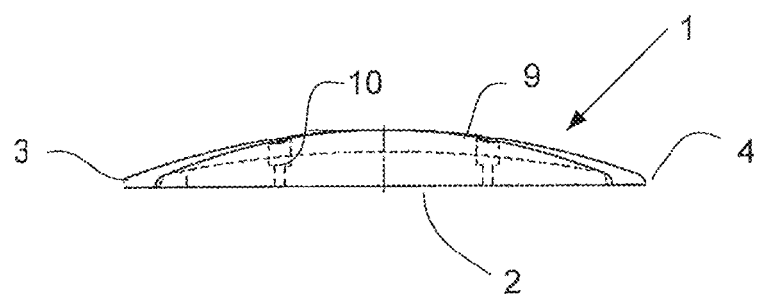
FIG. 2 is a cross section according to II-II in FIG. 1.
Figure 3:
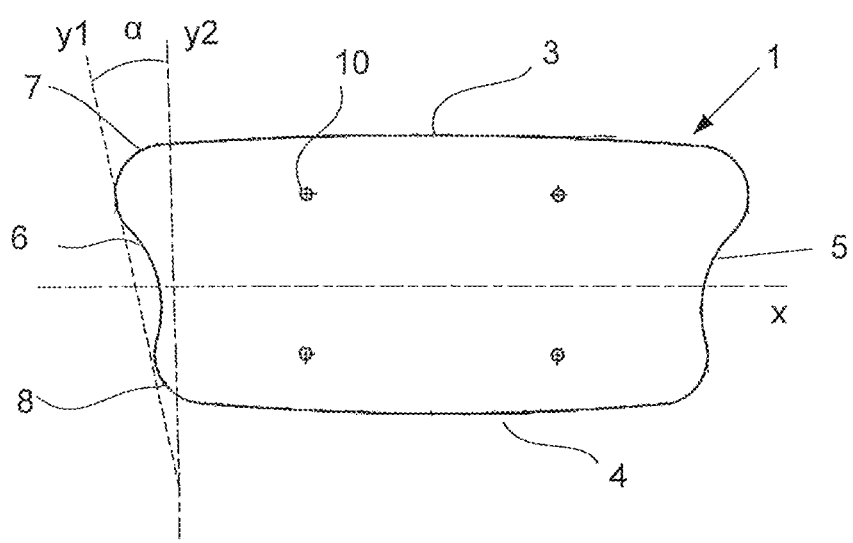
FIG. 3 is a view from above of the device shown in FIG. 1.

FIGS. 1-3 show a first embodiment of an animal rear leg position control device according to the present invention. The animal rear leg position control device comprises a body 1 that has a lower side 2 that is configured to rest in an operative position on a floor of a milking stable. Further, said body 1 presents a first lateral side 3 and a second lateral side 4 that is opposite to the first lateral side 3. Said body 1 also presents a front end 5 and a rear side 6 that is opposite to the front end 5, wherein a longitudinal direction of the body is defined by a line x extending from the front end 5 to the rear side 6. The body 1 also presents a first transition area where the first lateral side 3 transitions into the rear side 6 and defines a first rear corner 7 of said body, and a second transition area where the second lateral side 4 transitions into the rear side 6 and defines a second rear corner 8 of said body 1.

As can be seen in particular in FIG. 3, the first rear corner 7 and the second rear corner 8 are positioned at different longitudinal positions in the longitudinal direction of the body 1. In FIG. 3 this is illustrated by a rectilinear line y1 extending from the first rear corner 7 to the second rear corner 8 and a line y2 that is perpendicular to the longitudinal direction of the body 1. The line x that defines the longitudinal direction is a centre line of the body 1 extending between the first and second lateral sides 3, 4 from a mid-point of the front end 5 to a mid-point of the rear side 6. In the shown embodiment, the rectilinear line y1 that extends from the first rear corner to the second rear corner has an angle α of approximately 20° relative the line y2 that is perpendicular to the longitudinal direction of said body 1.

The first and second lateral sides 3, 4 are parallel and are of different length, and the overall shape of said body 1, as seen from above, is an isosceles trapezoidal shape. The rear side 6 is concave between the first rear corner 7 and the second rear corner 8. Alternatively it may be rectilinear. The first and second rear corners 7, 8 have a rounded shape with a radius of curvature of at least 3 cm.

The body 1 has a maximum height which is more than 5 cm. In this specific embodiment the maximum height is 6.5 cm. As can be seen in FIG. 2, the body 1 has an upper surface 9 which slopes from an apex point where the body 1 has its maximum height towards the first lateral side 3 and towards the second lateral side 4. The apex point is located above the centre line x of the body 1.

The body 1 is made of a suitable material such as stainless steel, hard rubber or polymer. It may be attached to the floor of a milking stable by means of bolts that are screwed through the body 1 into the floor. Holes 10 extending from the upper surface 9 to the bottom surface 2 and aimed for receiving such bolts are therefore also provided in the body 1.

Figure 4:
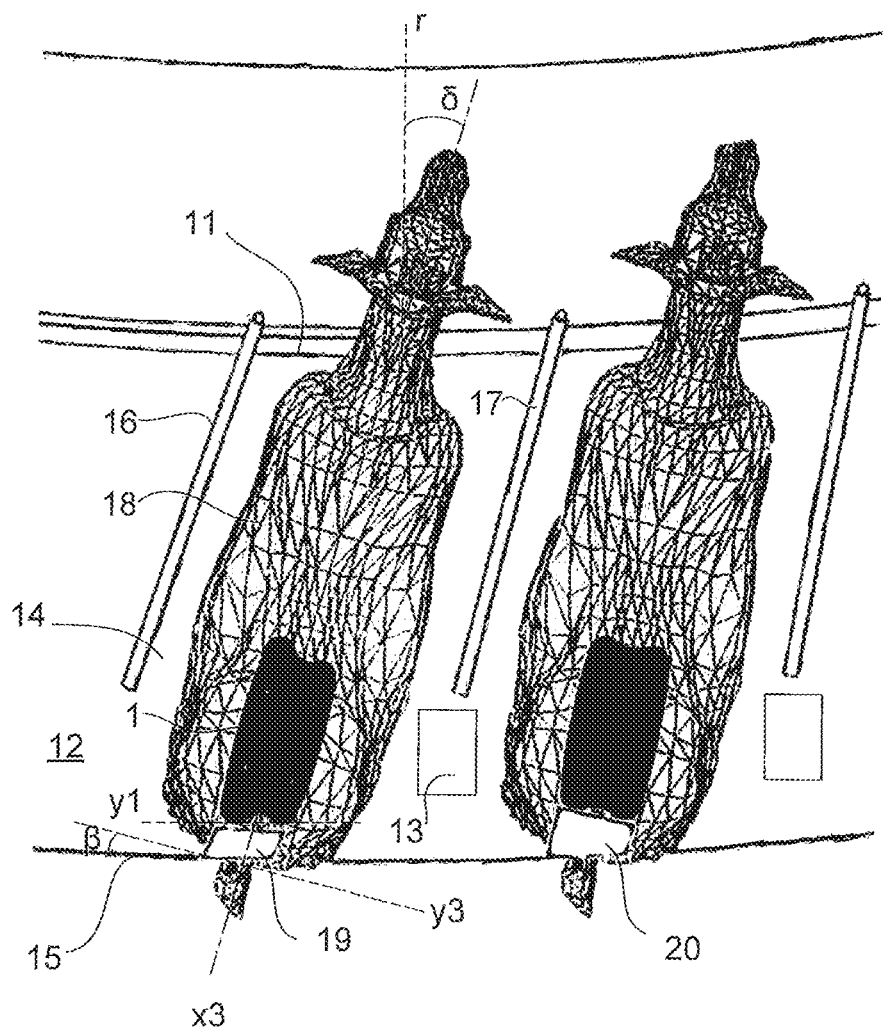
FIG. 4 is a perspective view from above of two milking stables provided with an animal rear leg position control device according to the invention and an animal rear leg position control device according to prior art respectively.

FIG. 4 shows two milking stables provided with an animal rear leg position control device according to the invention (to the left) and an animal rear leg position control device according to prior art (to the right) respectively. Apart from the different rear leg position control device, the two milking stables are identical. The milking stable according to the invention comprises a front part 11, a rear part 12, a milking apparatus 13 arranged in the region of the rear part 12. The milking stable also comprises a floor 14 that, in the rear part 12 of the milking stable, has a rear edge 15. The rear edge 15 has a curvature. At the point where the rear edge 15 is intersected by the centre line x3 of the milking stable the tangent of the rear edge 15 has an angle β of approximately 20° in relation to a line y3 that is perpendicular in relation to a longitudinal direction x3 of the milking stable. The longitudinal direction x3 of the milking stable is defined by a line x3 extending in parallel with and in the middle between two parallel lateral walls 16, 17 that define the width of the milking stable. The lateral walls 16, 17 are formed by metal bars.

The milking stable is configured to house an animal 18, in this case a cow, standing with its head turned towards the front part 11 of the milking stable during milking of the animal 18 by means of the milking apparatus 13 and with its rear legs in the rear part 12 of the milking stable.

For the purpose of preventing the animal 18 from standing with a too short distance between its rear legs, that would make it difficult to attach the relevant part of the milking apparatus 13 to the udder of the animal 18 the milking stable comprises an animal rear leg position control device according to the present invention positioned in the rear part 12 of the milking stable. The animal rear leg position control device shown in FIG. 4 is the same embodiment as shown in FIGS. 1-3. The rear side 6 of the body 1 of the animal rear leg position control device is turned towards the rear edge 15 of the floor 14 of the milking stable.

The centre line x that defines the longitudinal direction of the body 1 coincides with the centre line x3 of the milking stable that defines the longitudinal direction of the milking stable. The rectilinear line y1 that extends from the first rear corner 7 to the second rear corner 8 of the body 1 of the animal rear leg position control device is generally parallel to the tangent of the rear edge 15 of the floor 14 of the milking stable where the rear edge 15 is intersected by the centre line x3 of the milking stable. A zone 19 between the rear side 6 of the body 1 and the rear edge 15 of the floor 14 has been indicated in FIG. 4.

The milking stable to the right in FIG. 4 has an animal rear leg position control device according to prior art which is also positioned with its centre line coinciding with the centre line of the milking stable in which it is arranged. A zone 20 corresponding to the zone 19 indicated in the milking stable according to the invention is also shown in the milking stable according to prior art. The zone 19 in the milking stable according to the invention has almost the same distance between the first rear corner 7 of the body 1 and the rear edge 15 of the floor as between the second rear corner 8 and the rear edge 15. The zone 19 is symmetric or very close to symmetric. The zone 20 of the milking stable of prior art, on the other hand, is asymmetric and presents a much larger distance between a first rear corner and the rear edge than between a second rear corner and the rear edge of the floor, leaving more space for the animal to place its hoof there. Thereby, the risk of having the animal standing with to short distance between its rear legs is increased.

The milking stable of the present invention shown in FIG. 4 is one of a plurality of milking stables of a rotary parlour. In the rotary parlour, each stable has a longitudinal direction defined by its centre line x3 which has an angle δ of approximately 20° in relation to a radius r extending from the rotational axis of the rotating platform. Said rotary parlour is thus characterised in that the milking stables arranged on the rotating platform are milking stables according to the present invention.

Figure 5:
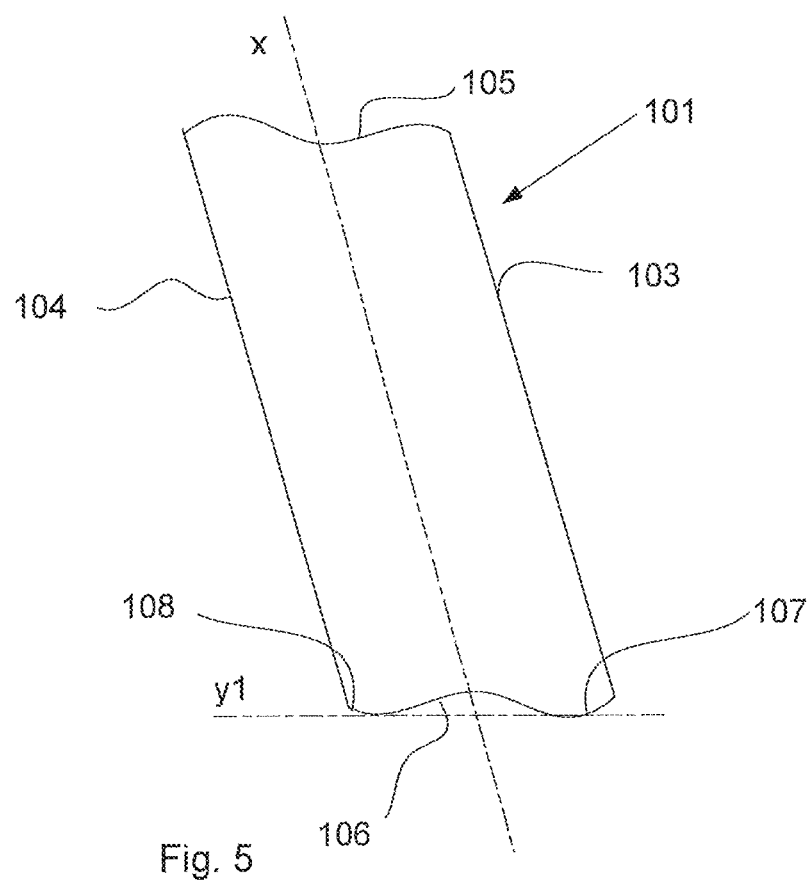
FIG. 5 is a view from above of a second embodiment of an animal rear leg position control device according to the present invention.

FIG. 5 shows an alternative embodiment of the animal rear leg position control device according to the present invention. The body 101 has first and second lateral sides 103, 104 that are of equal length and that extend in parallel with each other. However, the lateral sides 103, 104 are displaced in relation to each other in the longitudinal direction of the body 101. The front end 105 and the rear side 106 have similar curvature. They could be rectilinear and parallel. The overall shape of the body, as seen from above, is a parallelogram shape. The first rear corner 107 and the second rear corner 108 are positioned at different longitudinal positions in the longitudinal direction of the body 101. A line x that defines the longitudinal direction of the body 101 is a centre line extending between the first and second lateral sides 103, 104 from a mid-point of the front end 105 to a mid-point of the rear side 106.

Figure 6:
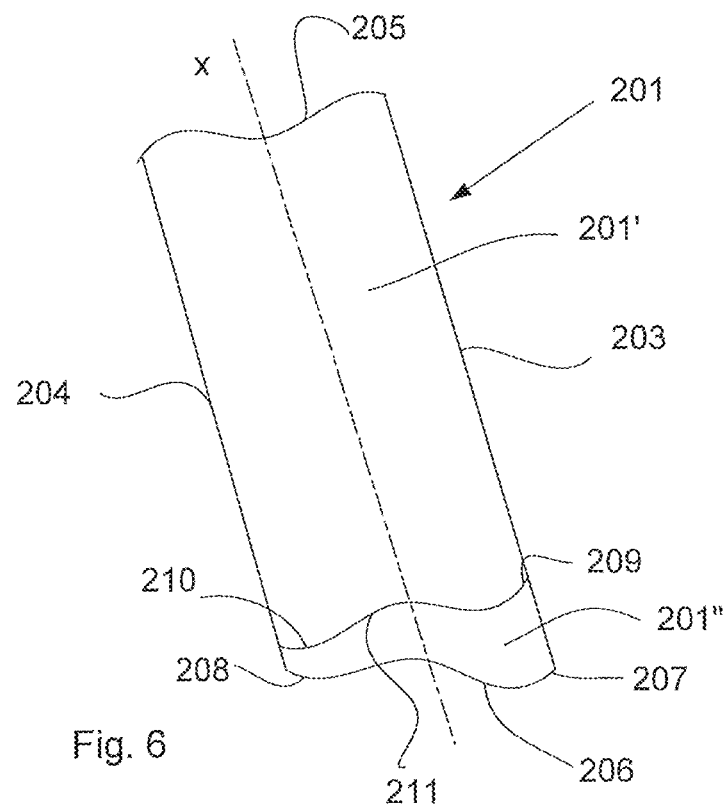
FIG. 6 is a view from above of a third embodiment of an animal rear leg position control device according to the present invention.

FIG. 6 shows a further embodiment of an animal rear leg position control device according to the present invention. The body 201 comprises two separate sub-bodies 201', 201" that together form said body 201. Likewise to other embodiments, the body 201 has a first lateral side 203 and a second lateral side 204, a front end 205 and a rear side 206. It also presents a first rear corner 207 and a second rear corner 208. A line x that defines the longitudinal direction of the body 201 is a centre line extending between the first and second lateral sides 203, 204 from a mid-point of the front end 205 to a mid-point of the rear side 206.

A first sub-body 201' has first and second rear corners 209, 210 that are positioned at the same longitudinal positions in the longitudinal direction of the body 201. A second sub-body 201" has a wedge shape as seen from above and is configured to be arranged along a rear side 211 of the first sub-body 201'. The second sub-body 201" may be seen as component that could be retrofitted on an animal rear leg position control device according to prior art. However, the design of the second sub-body itself is in accordance with the teaching of the present invention. Thus, the second sub-body 201" is protected in itself by scope of protection being requested in this application.

It should be noted that numerous combinations of sub-bodies will be obvious for the person skilled in the art without thereby departing from the scope of protection defined in the appending patent claims.

The invention claimed is:

1. An animal rear leg position control device, comprising:
 a body (1, 101, 201) having
  a lower side (2) that is configured to rest in an operative position on a floor (14) of a milking stable,
  a first lateral side (3, 103, 203),
  a second lateral side (4, 104, 204) that is opposite to the first lateral side (3, 103, 203),
  a front end (5, 105, 205), and
  a rear side (6, 106, 206) that is opposite to the front end (5, 105, 205),
  wherein a longitudinal direction of the body (1, 101, 201) is defined by a line (x) extending from the front end (5, 105, 205) to the rear side (6, 106, 206),
  wherein a first transition area, where the first lateral side (3, 103, 203) turns into the rear side (6, 106, 206), defines a first rear corner (7, 107, 207) of said body (1, 101, 201), and
  a second transition area, where the second lateral side (4, 104, 204) turns into the rear side (6, 106, 206), defines a second rear corner (8, 108, 208) of said body (1, 101, 201),
  wherein the front end (5, 105, 205) is configured to be turned towards a front part of a milking stable when said body (1, 101, 201) is in the operative position in the milking stable, and the rear side (6, 106, 206) is configured to be turned towards a rear part of a milking stable when said body (1, 101, 201) is in the operative position in the milking stable,
  wherein the first lateral side (3, 103, 203), the second lateral side (4, 104, 204), the front end (5, 105, 205), and the rear side (6, 106, 206) together define an outside perimeter of the body with the first rear corner (7, 107, 207) and the second rear corner (8, 108, 208) being a part of the outside perimeter along the rear side of the body, and
  wherein longitudinally end-most portions of the first rear corner (7, 107, 207) and the second rear corner (8, 108, 208) are positioned at different longitudinal positions in the longitudinal direction of the body (1, 101, 201) with the longitudinally end-most portion of the first rear corner (7, 107, 207) extending further along the longitudinal direction of said body (1, 101, 201) than the longitudinally end-most portion of the second rear corner (8, 108, 208) extending along the longitudinal direction of said body (1, 101, 201).

2. The animal rear leg position control device according to claim 1, wherein a rectilinear line (y1) that extends from the longitudinally end-most portion of the first rear corner (7, 107, 207) to the longitudinally end-most portion of the second rear corner (8, 108, 208) has an angle α in the range of 5°-45° relative a line (y2) which is perpendicular to the longitudinal direction of said body (1, 101, 201).

3. The animal rear leg position control device according to claim 1, wherein a rectilinear line (y1) that extends from the longitudinally end-most portion of the first rear corner (7, 107, 207) to the longitudinally end-most portion of the second rear corner (8, 108, 208) has an angle α in the range of 20°-45° relative a line (y2) that is perpendicular to the longitudinal direction of said body (1, 101, 201).

4. The animal rear leg position control device according to claim 1, wherein the first lateral side (3, 103, 203) is parallel to the second lateral side (4, 104, 204).

5. The animal rear leg position control device according to claim 1, wherein the first lateral side (103) has a same length as the second lateral side (104).

6. The animal rear leg position control device according to claim 1, wherein an overall shape of said body (101), as seen from above, is a parallelogram shape.

7. The animal rear leg position control device according to claim 1, wherein the first and second lateral sides (3, 4) have different lengths and an overall shape of said body (1), as seen from above, is an isosceles trapezoidal shape.

8. The animal rear leg position control device according to claim 1, wherein the line (x) that defines the longitudinal direction of the body (1, 101, 201) is a center line (x) extending between the first and second lateral sides (4, 104, 204) from a mid-point of the front end (5, 105, 205) to a mid-point of the rear side (6, 106, 206).

9. The animal rear leg position control device according to claim 1, wherein two or more separate sub-bodies (201', 201") together form said body (201).

10. The animal rear leg position control device according to claim 1,
wherein a first sub-body (201') and a second sub-body (201") together form said body (201), and
wherein the first sub-body (201') has first and second rear corners (209, 210) that are positioned at the same longitudinal positions in the longitudinal direction of the body (201), and the second sub-body (201") that has a wedge shape as seen from above and that is configured to be arranged along a rear side (211) of the first sub-body (201').

11. The animal rear leg position control device according to claim 1, wherein the body (1, 101, 201) has a maximum height of at least 5 cm.

12. The animal rear leg position control device according to claim 1, wherein a distance between the first lateral side (3, 103, 203) and the second lateral side (4, 104, 204) at each of the first and second transition areas is at least 20 cm.

13. The animal rear leg position control device according to claim 1, wherein a length of the body (1, 101, 201), as seen along the longitudinal direction from a mid-point of the rear side (6, 106, 206) to a mid-point of the front end (5, 105, 205), is at least 25 cm.

14. The animal rear leg position control device according to claim 2 in combination with a milking stable, comprising
a front part (11),
a rear part (12),
a milking apparatus (13) arranged in a region of the rear part (12),
a floor (14) that, in the rear part (12), has a rear edge (15),
wherein the rear edge (15) extends along a line that in relation to a line (y3) that is perpendicular in relation to a longitudinal direction (x3) of the milking stable has angle β in the range of 5°-45°,
wherein the milking stable is configured to house an animal (18) standing with its head turned towards the front part (11) of the milking stable during milking of the animal (18) with said milking apparatus (13) and with the animal's rear legs in the rear part (12) of the milking stable, and
wherein the animal rear leg position control device is positioned in the rear part (12) of the milking stable with the rear side (6, 106, 206) turned towards the rear edge (15) of the floor (14) of the milking stable.

15. The combination according to claim 14, wherein a rectilinear line (y1) extending from the first rear corner (7, 107, 207) to the second rear corner (8, 108, 208) of the animal rear leg position control device has an angle of not more than 10° to the rear edge (15) of the floor (14) of the milking stable.

16. The combination according to claim 14, wherein a rectilinear line (y1) extending from the first rear corner (7, 107, 207) to the second rear corner (8, 108, 208) of the animal rear leg position control device is parallel with the rear edge (15) of the floor (14) of the milking stable.

17. The combination according to claim 14, wherein a distance between the rear side (6, 106, 206) of the animal rear leg position control device and the rear edge (15) of the floor (14) of the milking stable is in the range of 5-15 cm.

18. The combination according to claim 14, wherein the longitudinal direction (x) of the animal rear leg position control device is parallel to the longitudinal direction (x3) of the milking stable.

19. The combination according to claim 14, wherein the milking stable is arranged on a rotary parlour.

20. A rotary parlour comprising a rotary platform on which there is arranged a plurality of the combination according to claim 14, each milking stable having a longitudinal direction (x3) which has an angle (δ) of 5°-45° in relation to a radius (r) extending from the rotational axis of the rotating platform.

* * * * *